United States Patent [19]

Yamamuro et al.

[11] Patent Number: 4,735,113
[45] Date of Patent: Apr. 5, 1988

[54] CREEP TORQUE AND LOCK-UP CONTROL FOR AUTOMATIC TRANSMISSION

[75] Inventors: Sigeaki Yamamuro, Zushi; Keiju Abo, Yokosuka; Hiroyuki Hirano; Haruyoshi Kumura, both of Yokohama; Masaki Nakano, Kawasaki, all of Japan

[73] Assignee: Nissan Motor Co., Ltd., Yokohama, Japan

[21] Appl. No.: 922,400

[22] Filed: Oct. 23, 1986

Related U.S. Application Data

[63] Continuation-in-part of Ser. No. 792,422, Oct. 29, 1985, abandoned.

[30] Foreign Application Priority Data

Oct. 30, 1984 [JP] Japan ................... 59-226706

[51] Int. Cl.⁴ ............ B60K 41/12; B60K 41/18
[52] U.S. Cl. .................... 74/866; 74/867; 74/868
[58] Field of Search ........ 74/865, 866, 867, 868, 74/730, 731, 732, 733; 192/3.31, 3.58, 0.076, 103 R

[56] References Cited

U.S. PATENT DOCUMENTS

| | | | |
|---|---|---|---|
| 4,090,417 | 5/1978 | Burcz et al. ............... | 74/864 |
| 4,428,259 | 1/1984 | Kubo et al. ............... | 74/865 X |
| 4,431,096 | 2/1984 | Kobayashi et al. ......... | 74/731 X |
| 4,432,255 | 2/1984 | Borman et al. ............ | 74/868 X |
| 4,468,988 | 9/1984 | Hiramatsu ................. | 74/868 |
| 4,478,105 | 10/1984 | Yamamuro et al. ........ | 74/730 |
| 4,526,065 | 7/1985 | Rosen et al. ............... | 74/868 X |
| 4,542,665 | 9/1985 | Yamamuro et al. ........ | 74/866 |
| 4,559,850 | 12/1985 | Sakakibara ................ | 74/868 |
| 4,561,328 | 12/1985 | Hiramatsu ................. | 74/869 |
| 4,579,021 | 4/1986 | Yamamuro et al. ........ | 74/868 X |
| 4,588,059 | 5/1986 | Miki et al. ................. | 192/3.28 |

FOREIGN PATENT DOCUMENTS 0128469 12/1984 European Pat. Off. .......... 74/733

Primary Examiner—Dirk Wright
Attorney, Agent, or Firm—Schwartz, Jeffery, Schwaab, Mack, Blumenthal & Evans

[57] ABSTRACT

A control device for an automatic transmission comprises an electromagnetic valve that is subject to pulse duty factor control and generates an adjustment pressure variable in a first pattern after a rod of a shift operation mechanism has moved into an overstroke range beyond a maximum reduction ratio position. The adjustment pressure is variable in a second pattern when the rod fails to move into the overstroke range. An adjustment pressure change-over valve is formed integral with the rod and applies the adjustment pressure to a servo actuating pressure regulator valve (i.e., a throttle valve) when the motor vehicle is at a standstill and the engine idles so as to effect a creep torque control. When the motor vehicle starts moving at a speed above a certain vehicle speed, the adjustment pressure change-over valve applies the adjustment pressure to a lock-up control valve, thereby to effect a lock-up control.

8 Claims, 7 Drawing Sheets

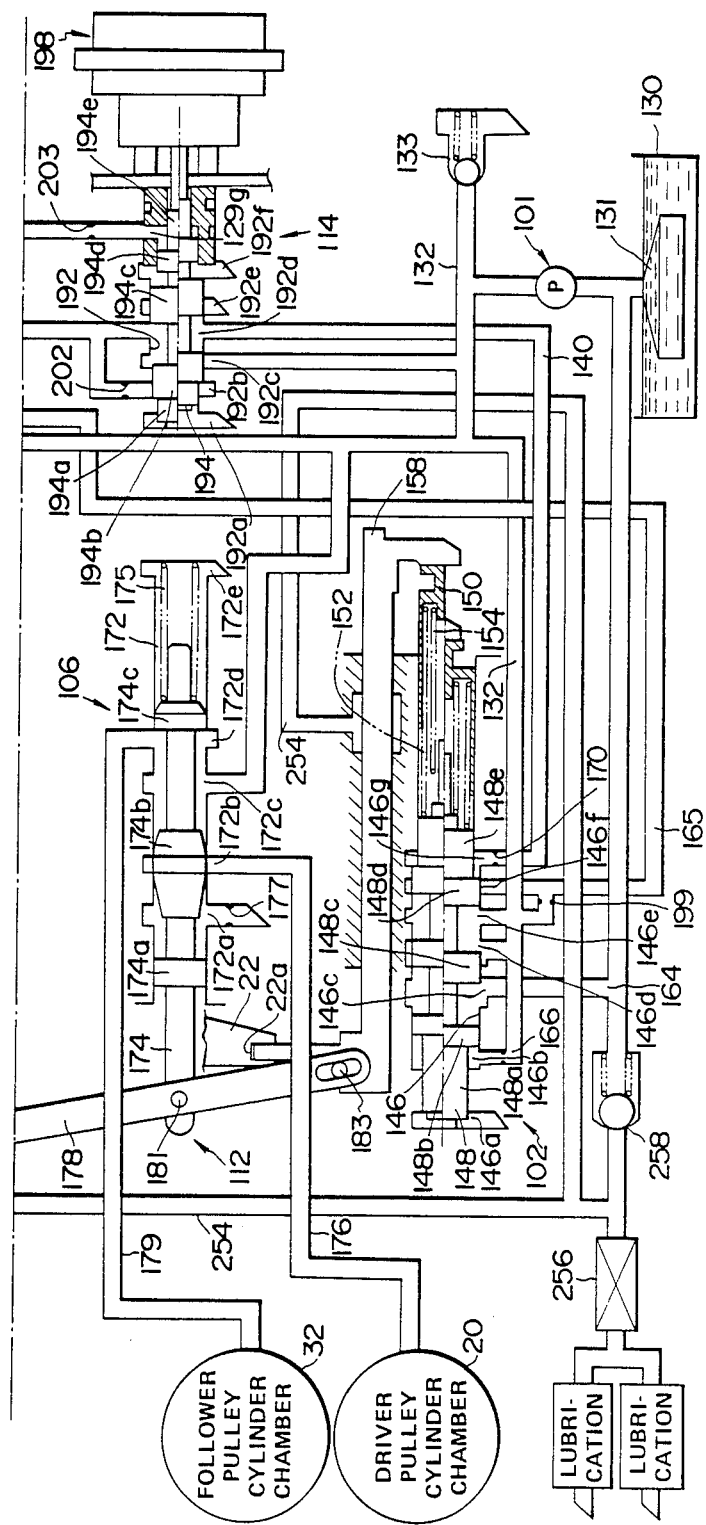

CREEP TORQUE AND LOCK-UP CONTROL FOR AUTOMATIC TRANSMISSION

STATUS OF THE APPLICATION

The present application is a continuation-in-part application of U.S. patent application Ser. No. 792,422, now abandoned, and claims priority on Japanese patent application No. 59-226706.

RELATED APPLICATIONS

U.S. patent application Ser. No. 792,422, now abandoned filed Oct. 29, 1985 filed by the same applicants of the present application and assigned to the same assignee thereof: This U.S. patent application claims the priority on Japanese Patent Application No. 59-226706 which was filed on Oct. 30, 1984 and laid open under publication No. 61-105351 on May 23, 1986. This U.S. patent application has a corresponding European Patent Application No. 85113788.5 which was filed on Oct. 29, 1985 and laid open under publication No. 0180209 on May 7, 1986.

U.S. patent application Ser. No. 882,357, filed July 7, 1986: This U.S. application has been assigned to the same assignee of the present application.

BACKGROUND OF THE INVENTION

The present invention relates to a creep torque and lock-up control for an automatic transmission.

Laying-open Japanese patent application No. 59-75840 (U.S. counterpart: U.S. Ser. No. 543,838 (now U.S. Pat. No. 4,542,665), filed Oct. 20, 1983 (EP counterpart: European patent application EP No. 83110546.5, filed Oct. 21, 1983) discloses a control device for a hydraulic automatic clutch used as a starting clutch in an automatic transmission in the form of a continuously variable transmission. According to this control, hydraulic fluid pressure supplied to a starting clutch is controlled by a start adjustment valve such that engagement state of the starting clutch taking place at engine idling is kept at a predetermined state. With this control, the starting clutch is controlled such that it produces a predetermined creep torque at engine idling.

However, in the case of the use of an automatic transmission employing a hydrokinetic torque transmitting unit provided with a lock-up mechanism, it is also necessary to control the lock-up mechanism in such a manner that it is engaged or released upon satisfying a predetermined condition in addition to controlling the forward/reverse clutch in the above mentioned manner so as to cause it to produce a predetermined creep torque. To accomplish this mission, another solenoid is required which shifts the lock-up control valve based on, for example, vehicle speed signal and throttle opening degree signal. This causes an increase in the installation space of the control device and an increase in manufacturing cost.

An object of the present invention is to solve the above mentioned problem and to provide a control device for an automatic transmission which can execute two different controls without any substantial increase in the number of hardware components, thus avoiding any increase in the installation space of the control device and in manufacturing cost.

SUMMARY OF THE INVENTION

Accordingly to the present invention, the above mentioned problem is solved by using a common hardware component in executing one of the two different controls as well as in executing the other controls on sharing basis.

According to one aspect of the present invention, there is provided a control device for an automatic transmission for a motor vehicle having an engine, the automatic transmission including a hydrokinetic torque transmitting unit having an input element coupled with the engine and an output element, the hydokinetic torque transmitting unit having a lock-up mechanism that is hydraulically operated and having a lock-up state where the input element is mechanically connected with the output element and a release state where the input element is fluidly connected with the output element, the automatic transmission also including a drive mechanism drivingly connected to the output element of the hydrokinetic torque transmitting unit, the drive mechanism including a hydraulically operated friction device that is engageable to establish a torque delivery path through the drive mechanism, said control device comprising:

means for generating a servo actuating hydraulic fluid pressure for actuating the hydraulically operated friction device, said sero actuating hydraulic fluid pressure being supplied to the hydraulically operated friction device;

means, including a lock-up control valve having a valve member movable between a lock-up position and a release position, for rendering the lock-up mechanism in the lock-up state when said valve member assumes said lock-up position, and rendering the lock-up mechanism in the release state when said valve member assumes said release position, an electromagnetic means for effecting a pressure regulation and generating an adjustment fluid pressure;

means for connecting said electromagnetic means to said servo actuating hydraulic fluid pressure generating means in such a manner as to modify said servo actuating fluid pressure by said adjustment fluid pressure when a predetermined condition of the motor vehicle is satisfied, and for connecting said electromagnetic means to said lock-up control valve in such a manner as to urge said valve member of said lock-up control valve by said adjustment fluid pressure when said predetermined condition fails to be satisfied and means for controlling said electromagnetic means such that said adjustment fluid pressure is variable in a first pattern when said predetermined condition is satisfied and said adjustment fluid pressure is variable in a second pattern when said predetermined condition fails to be satisfied.

According to another aspect of the present invention, there is provided a control device for an automatic transmission for a motor vehicle having an engine with a throttle, the automatic transmission including a hydrokinetic torque transmitting unit having an input element coupled with the engine and an output element, the hydrokinetic torque transmitting unit having a lock-up mechanism that is hydraulically operated and having a lock-up state where the input element is mechanically connected with the output element and a release state where the input element is fluidly connected with the output element, the automatic transmission also including a drive mechanism drivingly connected to the output element of the hydrokinetic torque transmitting unit, the drive mechanism including a hydraulically operated friction device that is engageable to establish a torque delivery path through the drive mechanism, said control device comprising:

means for generating a servo actuating hydraulic fluid pressure for actuating the hydraulically operated friction device, said servo actuating hydraulic fluid pressure being supplied to the hydraulically operated friction device;

means, including a lock-up control valve having a valve member movable between a lock-up position and a release position, for rendering the lock-up mechanism in the lock-up state when said valve member assumes said lock-up position, and rendering the lock-up mechanism in the release state when said valve member assumes said release position;

means for generating a constant hydraulic fluid pressure;

means for defining a first fluid line connecting said constant hydraulic fluid pressure generating means to said servo actuating fluid pressure generating means;

means for defining a second fluid line connecting said constant hydraulic fluid pressure to said lock-up control valve;

means including a drain line for connecting said first fluid line to said drain line when a predetermined condition of the motor vehicle is satisfied, and for connecting said second fluid line to said drain line when said predetermined condition fails to be satisfied;

means for regulating the discharge of hydraulic fluid from said drain line; and means for controlling said regulating means so that an adjustment hydraulic fluid pressure variable in a first pattern builds up in said first fluid line when said predetermined condition of the motor vehicle is satisfied and an adjustment hydraulic fluid pressure variable in a second pattern builds up in said second fluid line when said predetermined condition of the motor vehicle fails to be satisfied, said adjustment hydraulic fluid pressure variable in said first pattern being supplied to said servo actating hydraulic fluid pressure generating means to modify said servo actuating hydraulic fluid pressure, said adjustment hydraulic fluid pressure variable in said second pattern being supplied to said lock-up control valve to bias said valve member.

According to the control device as mentioned above, the adjustment hydraulic fluid pressure is used to modify the servo actuating hydraulic fluid pressure supplied to the hydraulically operated friction device so as to effect a desired creep torque control when the motor vehicle is almost at a standstill and the engine idles. Since the servo actuating hydraulic fluid pressure that is well adjusted acts on the hydraulically operated friction device, shocks which would take place after placing a shift lever from a neutral range position to a drive range position are substantially suppressed. The adjustment hydraulic fluid pressure is applied to the lock-up control valve and used to control the lock-up mechanism of the hydrokinetic torque transmitting unit when the motor vehicle is running.

BRIEF DESCRIPTION OF THE DRAWINGS

FIGS. 1A and 1B, when combined are a hydraulic circuit diagram showing a control device according to the present invention for an automatic transmission, in the form of a continuously variable transmission

DESCRIPTION OF THE EMBODIMENT

Hereinafter, the present invention is described referring to a control device for an automatic transmission for a motor vehicle. Although the following description proceeds with a continuously variable transmission, it is not intended that the present invention is limited to such a continuously variable transmission. The present invention may be applicable to a control device for an ordinary automatic transmission which is siftable between a plurality of reduction ratios.

Figure 2:
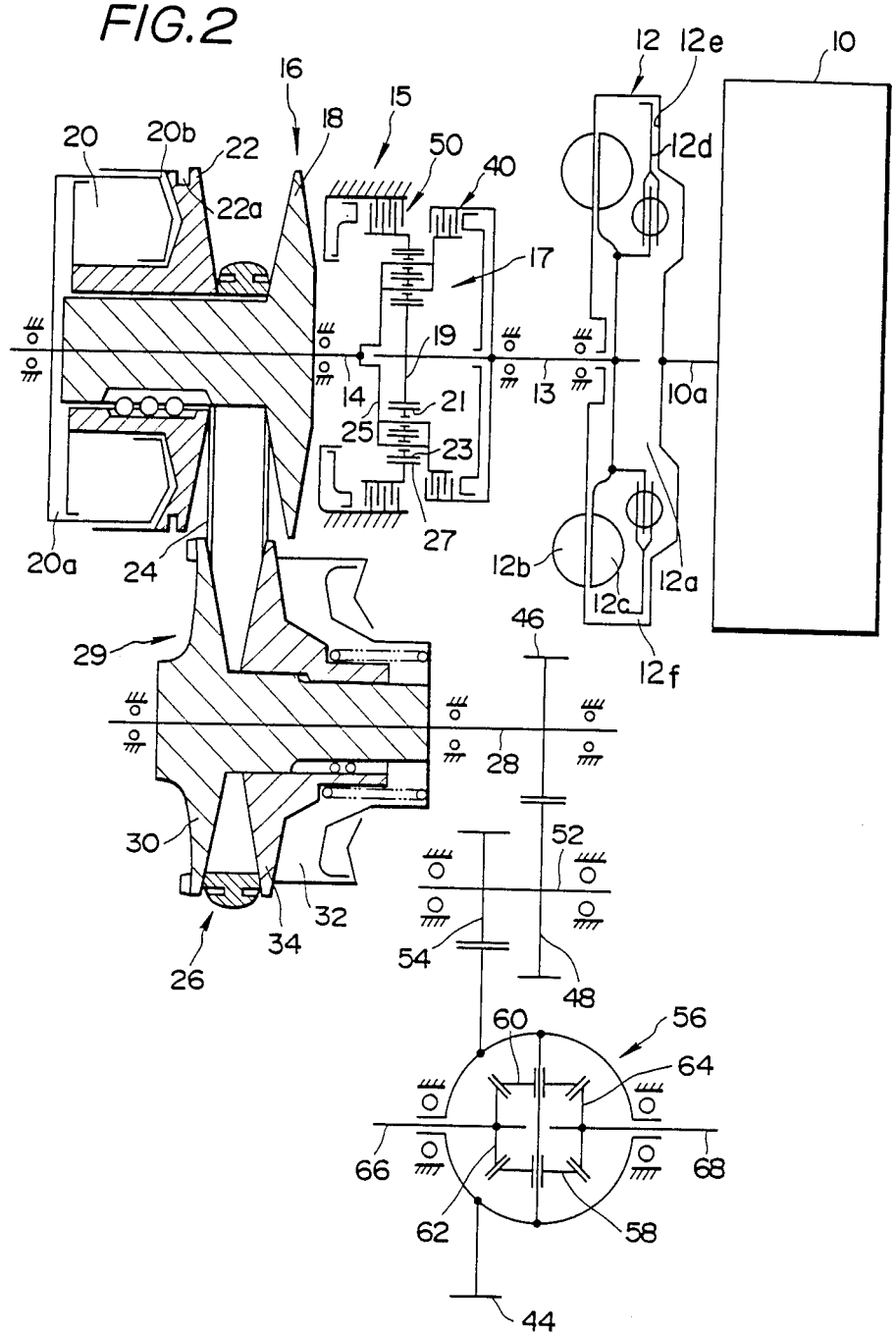
FIG. 2 is a schematic diagram showing a power transfer mechanism of the continuously variable transmission

Referring to FIG. 2, there is shown a power transfer mechanism for a continuously variable transmission. There is shown an engine 10 having an output shaft 10a which is coupled with a hydrokinetic torque transmitting unit in the form of a fluid coupling 12. Fluid coupling 12 is equipped with a lock-up mechanism which is hydraulically operated and has a lock-up state where a pump impeller 12b, i.e., an input element, is mechanically connected with a turbine runner 12c, i.e., an output element, and a release state where the former is fluidly connected with the latter by controlling the direction in the supply of hydraulic fluid to pressure to the inside of fluid coupling 12 so as to drain a lock-up fluid chamber 12a or pressure build-up therein. The lock-up mechanism includes a friction clutch element 12d rotatable with turbine runner 12c. Clutch element 12d divides the inside of fluid coupling 12 into two chambers, including a lock-up fluid chamber 12a, on the opposite sides thereof. When it is in the illustrated position in FIG. 2, clutch element 12d is disengaged from the adjacent end wall 12e rotatable with pump impeller 12b. This illustrated position is established when hydraulic fluid is supplied to lock-up chamber 12a. The hydraulic fluid is then allowed to pass through a clearance 12f formed around the outer periphery of clutch element 12d to flow into the inside of fluid coupling 12, i.e., a torous circuit formed by pump impeller 12b and turbine runner 12c. When hydraulic fluid is discharged from lock-up fluid chamber 12a and hydraulic fluid is supplied directly into the inside of fluid coupling 12, there occurs a pressure difference across clutch element 12d urging same into firm engagement with the adjacent wall 12e. The output element of fluid coupling 21 is coupled with a rotary shaft 13. Rotary shaft 13 is coupled with a forward/reverse drive change-over mechanism 15. Forward/reverse drive change-over mechanism 15 has a planetary gearing 17, a forward clutch 40, and a reverse brake 50. Planetary gearing 17 comprises a sun gear 19, a pinion carrier 25 having two pinion gears 21, 23, and a ring gear 27 (also called as an internal gear). Two pinion gears 21, 23 are intermeshed, pinion gear 21 meshes with sun gear 19, and pinion gear 23 meshes with ring gear 27. Sun gear 19 is coupled with rotary shaft 13 for unitary rotation therewith. Pinion carrier 25 is selectively coupled with rotary shaft 13 via forward clutch 40. Ring gear 27 is selectively held to a stationary portion via reverse brake 50. Pinion carrier 25 is coupled with a driver shaft 14 arranged coaxially with rotary shaft 13. Mounted on driver shaft 14 is a driver pulley 16. Driver pulley 16 comprises an axially stationary conical disk (pulley element) 18, and an axially movable conical disk (pulley element) 22 that is arranged in opposed relationship with axially stationary conical disk 18 so as to define a V-shaped pulley groove therebetween and displaceable in axial direction of driver shaft 14 under bias of hydraulic fluid pressure applied to the driver pulley cylinder chamber 20 (servo chamber). Driver pulley cylinder chamber 20 comprises two chambers 20a and 20b, and has a pressure acting area twice as large as a pressure acting area of a later described follower pulley cylinder chamber 32 (servo chamber). Driver pulley 16 is drivingly connected to follower pulley 26 via a V-belt 24. Follower pulley 26 is mounted on a follower shaft 28. Follower pulley 26 comprises an axially stationary conical disk 30 (follower pulley element) rotatable with follower shaft 28, and an axially movable conical disk 34 that is arranged in opposed relationship with axially stationary conical disk 30 so as to define a V-shaped pulley groove and displaceable in axial follower shaft 28 under the bias of hydraulic fluid pressure applied to a follower pulley cylinder chamber 32. Driver pulley 16, V-belt 24, and follower pulley 26 cooperate with each other to constitute a continuously variable V-belt transmission mechanism 29. Fixedly connected to follower shaft 28 is a driver gear 46 which is in mesh with an idler gear 48 rotatable with an idler shaft 52. Idler shaft 52 has a pinion gear 54 rotatable therewith, the pinion gear being in mesh with a final gear 44. A pair of pinion gears 58 and 60 that form part of a differential 56 are fixedly attached to final gear 44 for rotation therewith. Pinion gears 58, 60 are in mesh with a pair of side gears 62, 64, respectively, which are coupled with a pair of output shafts 66, 68, respectively.

Torque fed to the power transfer mechanism mentioned above by output shaft 10a of engine 10 is transferred via fluid coupling 12 and rotary shaft 13 to forward/reverse drive change-over mechanism 15. Then, the torque is transferred to driver shaft 14 depending upon the state of forward/reverse drive change-over mechanism 15 such that when forward clutch 40 is engaged and reverse brake 50 is released, the torque of rotary shaft 13 is transferred, as it is in terms of amount and direction, to driver shaft 14 via planetary gearing 17, whereas when forward clutch 40 is released and reverse brake 50 is engaged, planetary gearing 17 acts to inverse the direction of torque in transferring it from rotary shaft 13 to driver shaft 14. The torque transferred to driver shaft 14 is transferred via driver pulley 16, V-belt 24, follower pulley 26, follower shaft 28, driver gear 46, idler gear 48, idler shaft 52, pinion gear 54, and final gear 44 to differential 56 where it is translated to rotate output shafts 66, 68 in a forward or reverse direction. It is to be noted that the neutral is established when both forward clutch 40 and reverse brake 50 are released. In the process of the above mentioned torque transfer, the ratio of rotation between driver pulley 16 and follower pulley 26 can be varied by altering the contact radius of driver pulley 16 with V-belt 24 and that of follower pulley 26 with V-belt 24 via axial displacement of axially movable conical disk 22 of driver pulley 16 and axial displacement of movable conical disk 34 of follower pulley 26. For example, if the width of V-shaped pulley groove of driver pulley 16 is increased and the width of V-shaped pulley groove of follower pulley 26, is decreased, the contact radius of the driver pulley side 16 becomes small whereas that of follower pulley 26 side becomes large. This results in establishing a reduction ratio larger than before. If axially movable conical disks 22 and 34 are displaced in the directions opposite to the directions in which the counterparts displaced in the above mentioned case, a reduction ratio becomes small.

Figure 1A:
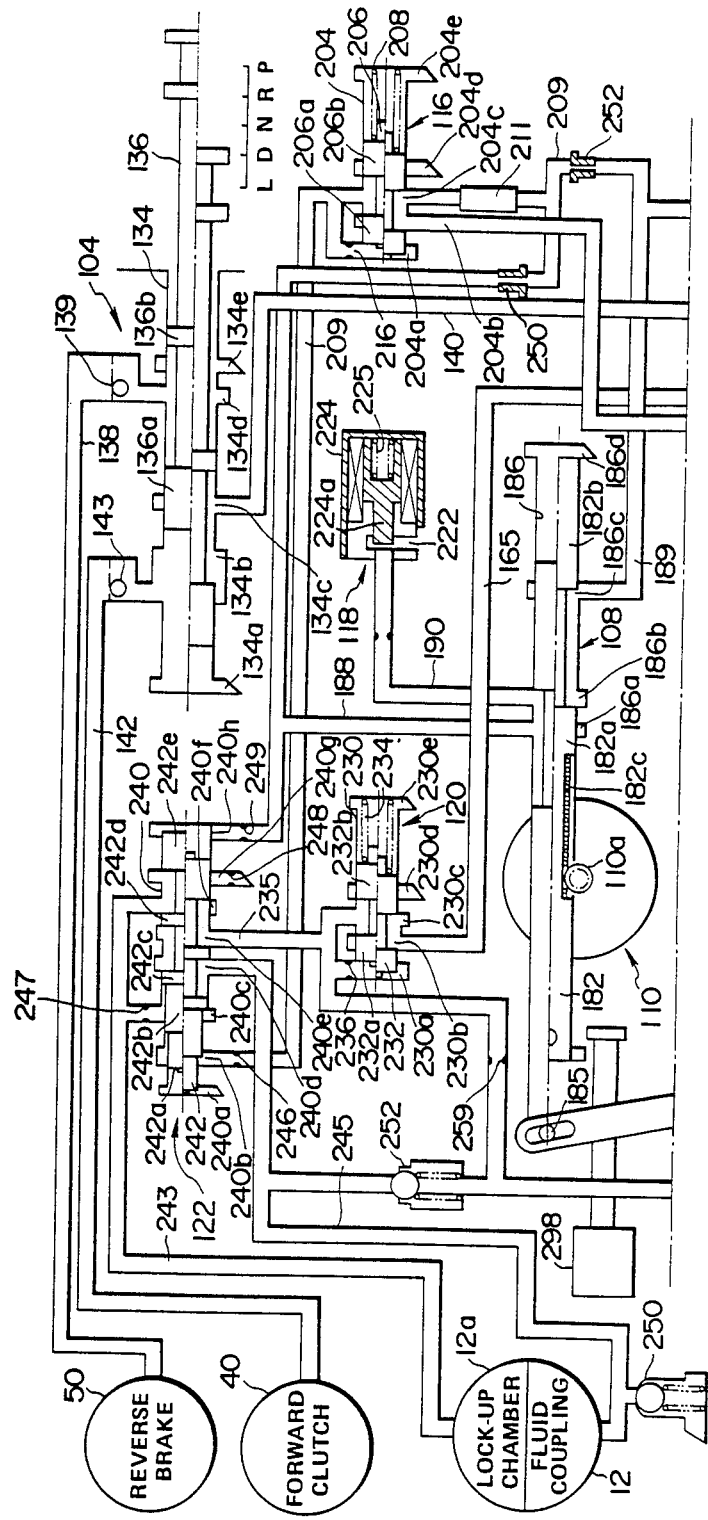

Hereinafter, a hydraulic pressure control device for the above mentioned continuously variable transmission is described. As shown in FIG. 1, the hydraulic pressure control device comprises a hydraulic fluid pump 101, a line pressure regulator valve 102, a manual valve 104, a shift control valve 106, an adjustment pressure change-over valve 108, a shift motor 110, a shift operation mechanism 112, a throttle valve 114, a constant pressure regulator valve 116, an electromagnetic valve 118, a coupling pressure regulator valve 120, and a lock-up control valve 122.

Hydraulic fluid pump 101 draws in hydraulic fluid (oil) from a tank 130 via a strainer 131, and discharge it into hydraulic fluid line 132. Hydraulic fluid line 132 conducts the discharged fluid to ports 146b, 146d and 146e of line pressure regulator valve 102 where pressure regulation is effected to build up a predetermined pressure, i.e., a line pressure which will be described later. Hydraulic fluid line 132 is allowed to communicate with a port 192c of a throttle valve 114 and a port 172c of shift control valve 106, too. Line 132 communicates also with a port 204b of constant pressure regulator valve 116. Provided in fluid line 132 is a line pressure relief valve 133 that prevents abnormal increase in line pressure.

Manual valve 104 has a valve bore 134, formed within a valve body, that is provided with five ports 134a, 134b, 134c, 134d, and 134e, and a spool 136 having two lands 136a and 136b which cooperate with the valve bore. Spool 136 which is urged to move by a selector lever (not shown), has five detent positions, namely P, R, N, D, and L ranges. Ports 134a and 134e are drain ports, and port 134b communicates with forward clutch 40 via hydraulic fluid line 142. Hydraulic fluid line 142 is provided with a one-way orifice 143 that provides a throttling effect only when hydraulic fluid is supplied to forward clutch 40. Port 134c communicates via a hydraulic fluid line 140 with ports 192b and 192d of throttle valve 114, and lastly port 134d communicates via a hydraulic fluid line 138 with reverse brake 50. Hydraulic fluid line 138 is provided with a one-way orifice 139 that provides a throttling effect only when hydraulic fluid is supplied to reverse brake 50. When spool 136 assumes P position, land 136a closes port 134c that is subject to throttle pressure in hydraulic fluid line 140 produced via pressure regulation by the later described throttle valve 114 (clutch pressure regulator valve), forward clutch 40 is drained via hydraulic fluid line 142 and drain port 134a of valve bore 134, and reverse brake 50 is drained via hydraulic fluid line 138 and drain port 134e. When spool 136 assumes R position, ports 134c and 134d are allowed to communicate with each other via a space within the valve bore defined between lands 136a and 136b, and thus reverse brake 50 is supplied with throttle pressure from fluid line 140, whereas forward clutch 40 is drained via port 134a. When spool 136 assumes N position, port 134c is positioned between lands 136a and 136b, and thus it is prevented from communicating with the other ports, whereas ports 134b and 134d are drained, so that, similarly to the situation established when in P position, reverse brake 50 and forward clutch 40 are both drained. When spool 136 assumes D or L position, ports 134b and 134c are allowed to communicate with each other via the space within the valve bore defined between lands 136a and 136b, allowing supply of throttle pressure to forward clutch 40, whereas reverse brake 50 is drained via port 134e. As a result, power transfer is interrupted owing to the release of both forward clutch 40 and reverse brake 50 when spool 136 assumes P position or N position, thus preventing transfer of torque of rotary shaft 13 to driver shaft 14, output shafts 66 and 68 are driven in forward direction owing to engagement of reverse brake 50 when spool 136 assumes R position, and output shafts 66 and 68 are driven in reverse direction owing to engagement or forward clutch 40 when spool 136 assumes D or L position. As will be understood from the above description, there occurs no difference in terms of hydraulic pressure circuit between D position and L position, but a difference in position between them is electrically detected for use in controlling a shift motor 110 later described in shifting the transmission in accordance with different shift patterns.

Line pressure regulator valve 102 has a valve bore 146, formed within the valve body, that is provided with seven ports 146a, 146b, 146c, 146d, 146e, 146f, and 146g, and a spool 148 having five lands 148a, 148b, 148c, 148d, and 148e which cooperate with valve bore 146, a sleeve 150 axially movable within valve bore 146, and two coaxially arranged springs 152 and 154 that are disposed between spool 148 and sleeve 150. Sleeve 150 in abutting engagement with a bias member 158 is urged to move to the left as viewed in FIG. 1 in response to leftward movement of the bias member 158. Bias member 158 is mounted within the valve body in parallel to the axis of valve bore 146, and it is formed, at the opposite end portion, with an integral arm meshing with a circumferential groove 22a with which axially movable conical disk 22 of driver pulley 16 is formed. Arrangement is such that an increase in reduction ratio causes movement of sleeve 150 to the left as viewed in FIG. 1, whereas a decrease in reduction ratio causes movement of sleeve 150 to the right as viewed in FIG. 1. Among two springs 152 and 154, spring 152 arranged outside has opposite ends thereof always engaged by sleeve 150 and spool 148 and thus it is always in its compressed state, whereas spring 154 inside is not compressed until sleeve 150 is moved to the left as viewed in FIG. 1 from a position indicated by the upper half thereof by a predetermined distance. Port 146a of line pressure regulator valve 102 is a drain port. Port 146g is supplied with throttle pressure from hydraulic fluid line 140 that serves as a throttle pressure circuit. Port 146c communicates with hydraulic fluid line 164 that serves as a drain circuit. Ports 146b, 146d, and 146e communicate with hydraulic fluid line 132 that serves as a line pressure circuit. Port 146f communicates via a hydraulic fluid line 165 with a port 230b of coupling pressure regulator valve 120. Hydraulic fluid line 165 communicates with line pressure line 132 via an orifice 199. Inlets to ports 146b and 146g are provided with orifices 166 and 170, respectively. As a result, spool 148 of line pressure regulator valve 102 is subject to two forces directed to the left as viewed in FIG. 1, one due to spring 152 alone (or both of springs 152 and 154) and the other resulting from the fact that hydraulic fluid pressure (throttle pressure) applied to port 146g acts on a differential area between lands 148d and 148e, and it is also subject to a force directed to the right as viewed in FIG. 1 resulting from the fact that hydraulic fluid pressure (line pressure) applied to port 146b acts on a differential area between lands 148a and 148b. Thus, spool 148 effects pressure regulation to provide line pressure by adjusting the amount of drainage of hydraulic fluid from port 146d toward port 146c until equilibrium state is established where the above mentioned forces directed to the left and to the right balance with each other. As a result, line pressure becomes high as reduction ratio becomes large, and it is increased also in response to a rise in throttle pressure applied to port 146g. The adjustment of line pressure in the above mentioned manner meets the demand that gripping force of pulleys applied to V-belt be increased as reduction ratio becomes large because engine output torque increases as throttle pressure rises (viz., engine manifold vacuum decreases) and power transfer torque due to friction is to be increased by increasing V-belt gripping force by pulleys.

Shift control valve 106 has a valve bore 172, formed within the valve body, that is provided with five ports 172a, 172b, 172c, 172d, and 172e, and a spool 174 having three lands 174a, 174b, and 174c which cooperate with valve bore 172, and a spring 175 biasing spool 174 to the left as viewed in FIG. 1. Port 172b communicates via a hydraulic fluid line 176 with driver pulley cylinder chamber 20, and ports 172a and 172e are drain ports. The outlet of port 172a is provided with an orifice 177. Port 172d communicates via a hydraulic fluid line 179 with follower pulley cylinder chamber 32. Port 172c communicates with hydraulic fluid line 132 that serves as line pressure circuit, and is supplied with line pressure. Left end of spool 174 is rotatably mounted on a lever 178 of shift operation mechanism 112 which is later described by a pin 181 at a generally middle portion thereof. Because land 174b has an axial cross sectional configuration defined by a curved boundary, hydraulic fluid supplied to port 172b at line pressure mainly flows into port 172a, but it is partially discharged to port 172a. As a result, hydraulic pressure developed in port 172b is determined by the ratio of amount of incoming flow into this port to amount of discharging flow. Thus, leftward movement of spool 174 causes an increase in clearance disposed on the discharge side and a decrease in clearance disposed on the line pressure side, resulting in an increase in hydraulic pressure developed in port 172b. Usually, port 172d is supplied with line pressure applied to port 172c. Hydraulic pressure at port 172b is supplied via hydraulic fluid line 176 to driver pulley cylinder chamber 20, whereas hydraulic pressure at port 172d is supplied via hydraulic fluid line 179 to follower pulley cylinder chamber 32. As a result, leftward movement of spool 174 causes an increase in hydraulic pressure in driver pulley cylinder chamber 20, resulting in a decrease in width of V-shaped pulley groove of driver pulley 16, hand and an increase in width of V-shaped pulley groove of follower pulley 26. That is, this causes an increase in contact radius of driver pulley 16 with V-belt 24, and a decrease in contact radius of follower pulley 26 with V-belt 24, thus causing a decrease in reduction ratio. Rightward movement of spool 174 causes the reverse process to take place, thus causing an increase in reduction ratio.

Although, as mentioned before, lever 178 of shift operation mechanism 112 has middle portion thereof connected to spool 174 by pin 181 and has one end connected to the before mentioned bias member 158 by pin 183, the opposite end of lever 178 is connected to a rod 182 via a pin 185. Rod 182 is formed with a rack 182c that meshes with a pinion gear 110a of shift motor 110. With this shift operation mechanism 112, if pinion gear 110a of shift motor 110 that is subject to control of a shift control unit 300 is rotated in such a direction as to cause rod 182 to move to the right as viewed in FIG. 1, this rightward movement of rod 182 causes lever 178 to swing about pin 183 clockwise, thus urging spool 174 to shift control valve 106 that is connected to lever 178 to move to the right. As described previously, this causes axially movable conical disc 22 of driver pulley 16 to move to the left as viewed in FIG. 1, thus causing an increase in width of V-shaped pulley groove of driver pulley 16 and a decrease in V-shaped pulley groove of follower pulley 26, resulting in an increase in reduction ratio. Because one end of lever 178 is linked to bias member 158 via pin 183, the above mentioned movement of axially movable conical disk 22 causes bias member 158 to move to the left as viewed in FIG. 1, and this leftward movement of bias member 158 causes lever 178 to swing about pin 185 disposed on the other end thereof clockwise. Thus, spool 174 is pulled back to the left, tending to cause a decrease in reduction ratio. In this process, spool 174, driver pulley 16, and follower pulley 26 are stabilized in a reduction ratio providing state corresponding to the rotary position assumed by shift motor 110. If shift motor 110 is rotated in the opposite direction so to urge rod 182 to the left, this leftward movement of rod 182 causes the associated members to move in a similar manner until they assume a reduction ratio state corresponding to a new rotary position of shift motor 110. (Rod 182 is movable beyond the position corresponding to the maximum reduction ratio and further to the right, as viewed in FIG. 1, into an overstroke range, and movement of rod 182 into the overstroke range activate a change-over detection switch 298, and the output signal of this detection switch is supplied, as an input, to shift control unit 300.) Therefore, if shift motor 110 is actuated in accordance with a predetermined pattern, the reduction ratio varies accordingly, so that it is possible to control shifting the continuously variable transmission by controlling shift motor 110.

Shift motor 110 (which will be hereinafter called as stepper motor) is so controlled as to assume a rotary position that is determined in correspondance with a pulse number signal determined in shift control unit 300. Shift control unit 300 gives pulse number signal in accordance with a predetermined shift pattern. Adjustment pressure change-over valve 108 has a valve element thereof formed integrally with rod 182 of shift operation mechanism 112. That is, adjustment pressure change-over valve 108 has a valve bore 186, formed within the valve body, that is provided with ports 186a, 186b, 186c, 186d, and lands 182a and 182b formed on rod 182. Port 186a communicates with a hydraulic fluid line 188. Port 186b communicates with electromagnetically operated valve 118 via a hydraulic fluid line 190. Port 186c communicates with a hydraulic fluid line 189. Port 186d is a drain port. Normally, port 186a and port 186b are allowed to communicate with each other via a space defined within the valve bore between lands 182a and 182b, but when rod 182 is displaced into the overstroke range beyond the maximum reduction ratio corresponding position, port 186a is closed and port 186b is allowed to communicate with port 186c.

Throttle valve 114 (clutch pressure regulator valve) has a valve bore 192, formed in the valve body, that is provided with ports 192a, 192b, 192c, 192d, 192e, 192f, and 192g, a spool 194 having five lands 194a, 194b, 194c, 194d, and 194e, and a vacuum diaphragm 198 that biases spool 194. When intake manifold vacuum is lower than a predetermined value, for example, 300 mmHg, (viz., when intake manifold vacuum is near the atmospheric level), vacuum diaphragm 198 biases spool 194 with a force that is in inverse proportion to the magnitude of vacuum, whereas when the intake manifold vacuum is higher than the predetermined value, it applies no force to spool 194. Port 192a is a drain port, ports 192b and 192d communicate with hydraulic fluid line 140 serving as throttle pressure circuit, port 192c communicates with hydraulic fluid line serving as line pressure circuit, port 192e is a drain port, and port 192g communicates with the before mentioned hydraulic fluid line 189. The inlets to ports 192b and 192g are provided with orifices 202 and 203, respectively. Spool 194 is subject to two forces directed to the left as viewed in FIG. 1, one resulting from the fact that hydraulic fluid pressure applied to port 192g acts on a differential area between lands 194d and 194e and the other by vacuum diaphragm 198, and it is also subject to a force, directed to the right as viewed in FIG. 1, resulting from the fact hydraulic fluid pressure applied to port 192b acts on a differential area between lands 194a and 194b. Throttle valve 114 effects well known pressure regulation until the above mentioned forces balance with each other by using line pressure applied to port 192c as pressure source and port 192e as a discharge port. As a result, a throttle pressure builds up at ports 192b and 192d which corresponds to the force due to hydraulic pressure applied to port 192g and the force due to vacuum diaphragm 198. Since, in the above mentioned manner, it is adjusted in accordance with engine manifold vacuum, throttle pressure corresponds to engine output torque. That is, if engine output torque becomes large, throttle pressure takes a high value accordingly. Throttle pressure is adjusted also by hydraulic fluid pressure (adjustment pressure) applied to port 192g which will be described later more in detail.

Constant pressure regulator valve 116 has a valve bore 204, formed in the valve body, that is provided with ports 204a, 204b, 204c, 204d, and 204e, a spool 206 having lands 206a and 206b, and a spring 208 biasing spool 206 to the left as viewed in FIG. 1. Ports 204a and 204c communicate with a hydraulic fluid line 209. Port 204b communicates with hydraulic fluid line 132 serving as line pressure circuit. Ports 204d and 204e are drain ports. The inlet to port 204a is provided with an orifice 216. This constant pressure regulator valve 116 effects well known pressure regulation to provide constant hydraulic fluid pressure corresponding to the force of spring 208 in hydraulic fluid line 209. Hydraulic fluid line 209 is connected via a choke type throttle valve 250 with hydraulic fluid line 188 and it is connected via a choke type throttle valve 252 with hydraulic fluid line 189. Hydraulic fluid line 209 is provided with a filter 211.

Electromagnetically operated valve 118 is so constructed as to adjust the discharge, in amount, of hydraulic fluid from hydraulic fluid line 190 to a port 222 by a plunger 224a biased by a spring 225 toward a closed position where the discharge is prohibited under the control of a solenoid 224. Solenoid 224 is subject to pulse duty factor control by shift control unit 300. Since amount of hydraulic fluid discharged is in inverse proportion to amount of current passing through solenoid 224, hydraulic fluid pressure (adjustment pressure) is variable in inverse proportion to the amount of current passing through solenoid 224. When the vehicle comes to a halt and the engine begins to idle, rod 182 moves into the overstroke range and adjustment pressure change-over valve 108 assumes a position indicated by a lower half thereof as illustrated in FIG. 1 where hydraulic fluid line 190 is allowed to communicate with hydraulic fluid line 189, allowing the adjustment pressure obtained by electromagnetically operated valve 118 to act on port 192g of throttle valve 114. This causes throttle pressure to be controllably varied such that forward clutch 40 or reverse brake 50 is kept at slightly engaged state. Until the vehicle is started, this adjusted throttle pressure is supplied to forward clutch 40 or reverse brake 50, thus providing a predetermined creep torque. Besides, shocks which would take place upon selecting D from N range or selecting R from N range are substantially suppressed. Immediately after the vehicle is started, throttle pressure is increased in forward clutch 40 or reverse brake 50 is completely engaged. On ordinary running of the vehicle, adjustment pressure change-over valve 108 assumes a position indicates by an upper half thereof where hydraulic fluid line 190 is allowed to communicate with hydraulic fluid line 188, so that lock-up control valve 122 is shifted by the adjustment pressure as will be later described.

Coupling pressure regulator valve 120 has a valve bore 230, formed in the valve body, that is provided with ports 230a, 230b, 230c, 230d and 230e, a spool 232 having lands 232a and 232b, and a spring 234 biasing spool 232 to the left as viewed in FIG. 1. Ports 230a and 230c communicate with a hydraulic fluid line 235, port 230b is supplied with hydraulic fluid from hydraulic fluid line 165 which is discharged by line pressure regulator valve 102, and ports 230d and 230e are drain ports. The inlet to port 230a is provided with an orifice 236. Coupling pressure regulator valve 120 effects pressure regulation using hydraulic fluid pressure applied to port 230b as a source of hydraulic pressure and provides a constant hydraulic fluid pressure (coupling pressure) corresponding to the force of spring 234. This hydraulic fluid pressure is supplied to hydraulic fluid line 235. This coupling pressure is used as a working pressure within fluid coupling 12, and it is also used to actuate the lock-up mechanism.

Lock-up control valve 122 comprises a valve bore 240, formed in the valve body, that is provided with ports 240a, 240b, 240c, 240d, 240e, 240f, 240g, and 240h, and a spool 242 having lands 242a, 242b, 242c, 242d, and 242e. Ports 240a and 240g are drain ports, port 240b communicates with hydraulic fluid line 209, ports 240c and 240f communicate via hydraulic fluid line 243 with lock-up fluid chamber 12a, port 240d is connected with hydraulic fluid line 245 that communicates with fluid coupling 12. Port 240e is supplied with constant coupling pressure from hydraulic fluid line 235. Port 240h is connected with the before mentioned hydraulic fluid line 188. The inlets to ports 240b, 240c, 240g, and 240h are provided with orifices 246, 247, 248, and 249, respectively. This lock-up control valve 122 controls the supply of hydraulic fluid pressure to fluid coupling 12 and that to lock-up fluid chamber 12a. Spool 242 shifts from one position to another position when the following three forces attain a predetermined relationship, one due to hydraulic fluid pressure (i.e., constant fluid pressure obtained after pressure regulation by constant pressure regulator valve 116) applied to port 240b which acts on a differential area between lands 242a and 242b, another due to hydraulic fluid pressure applied to port 240c which acts on a differential area between 242b and 242c, and the other due to hydraulic fluid pressure (i.e., adjustment pressure) applied to port 140h which acts on axial end of land 242e. When spool 242 assumes a lock-up position indicated by the upper half thereof, port 240f is allowed to communicate with port 240g via a space defined in the valve bore between lands 242d and 242e, thus allowing lock-up fluid chamber 12a to be drained via port 240g. In this lock-up position, port 240d is allowed to communicate with port 240e via a space defined in the valve bore between lands 242c and 242d, thus allowing the supply of coupling pressure generated by coupling pressure regulator valve 120 in the inside of fluid coupling 12 via fluid line 245. As a result, the lock-up mechanism assumes the lock-up state. Hydraulic fluid line 245 is provided with a relief valve 250 that prevents application of abnormally high pressure to fluid coupling 12. When, on the other hand, spool 242 assumes a release position indicates by the lower half thereof as illustrated in FIG. 1, port 240e is allowed to communicate with port 240f via a space defined within the valve bore between lands 242d and 242e, thus allowing the supply of coupling pressure to lock-up fluid chamber 12a via hydraulic fluid line 243. Port 240d, in this position, is sealed by lands 242c and 242d. As a result, the lock-up mechanism assumes the release state, thus providing a state where hydraulic fluid is supplied, as working fluid pressure, to the inside of fluid coupling 12 via lock-up fluid chamber 12a past clearance 12f (see FIG. 2). Hydraulic fluid pressure within fluid coupling 12 is kept at a constant value by means of a pressure maintaining valve 252. Hydraulic fluid discharged by pressure maintaining valve 252 is supplied via hydraulic fluid line 254 to a cooler 256 where it is cooled before use for lubrication. Hydraulic fluid line 254 is provided with a cooler pressure maintaining valve 258. Hydraulic fluid discharged by cooler pressure maintaining valve 258 returns via hydraulic fluid line 164 to intake port of hydraulic fluid pump 101. Hydraulic fluid line 254 leads to an area where bias member 158 is slidably engaged with the valve body to lubricate there. Hydraulic fluid line 254 is connected via an orifice 259 with hydraulic fluid line 235 to secure minimal supply of hydraulic fluid.

Hereinafter, shift control unit 300 is further described which controls actuation of stepper motor 110 and solenoid 224.

Figure 3:
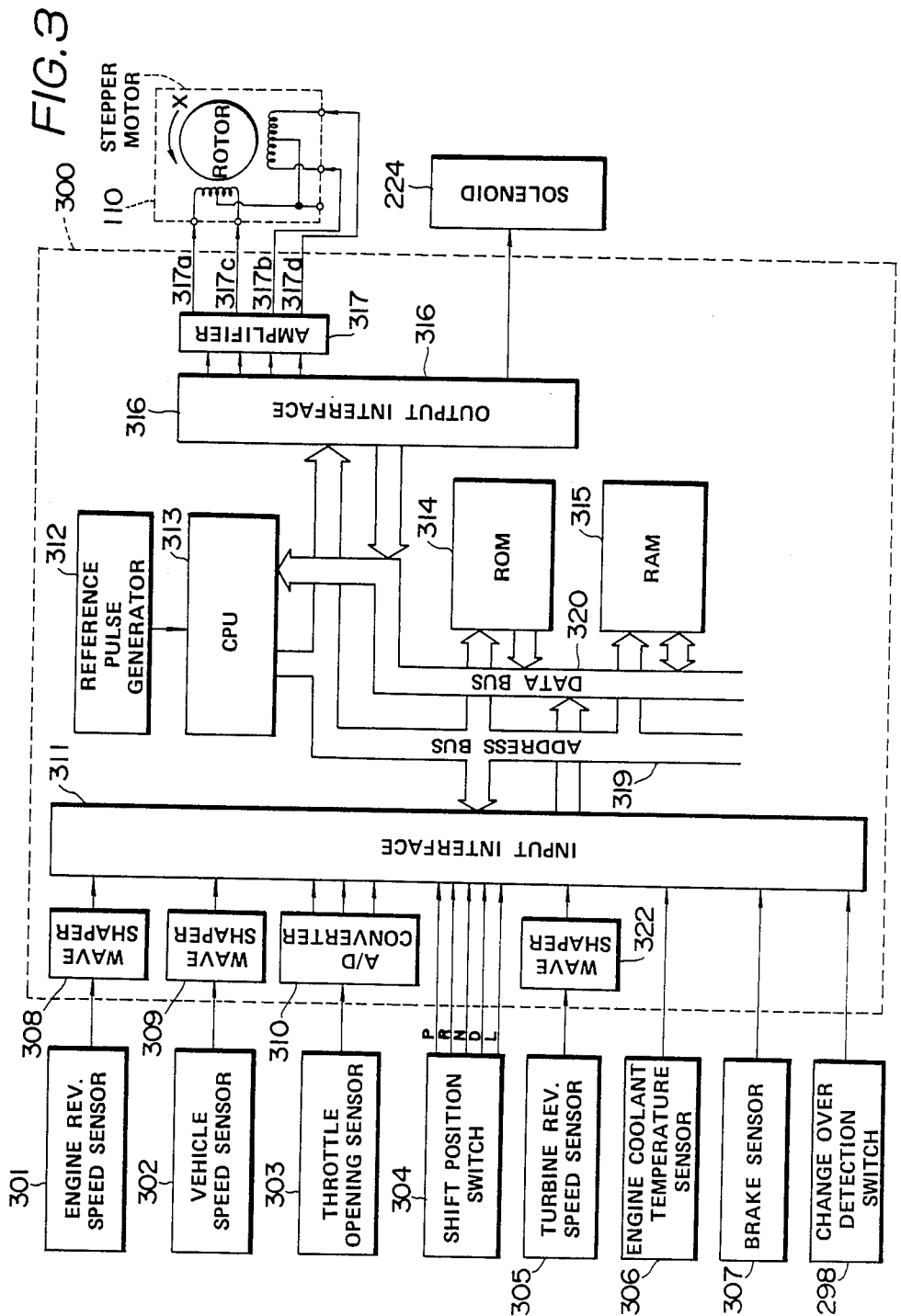
FIG. 3 is a block diagram showing a control unit for controlling shifting, creep torque, and lock-up FIGS. 4 and 5, when combined, show a flowchart of a control routine to be executed by the electronic control unit

As shown in FIG. 3, shift control unit 300 is supplied with electric signals, as input signals, from an engine revolution speed sensor 301, a vehicle speed sensor 302, a throttle opening degree sensor 303, a shift position switch 304, a turbine revolution speed sensor 305, a change-over detection switch 298, an engine coolant temperature sensor 306, and a brake sensor 307. Engine revolution speed sensor 301 detects engine revolution speed by counting the number of engine ignition spark pulses, and vehicle speed sensor 302 detects vehicle speed by measuring rotation of the output shaft of the continuously variable transmission. Throttle opening sensor 303 detects engine throttle opening degree in terms of an electric voltage. Shift position switch 304 detects which of positions P, R, N, D, and L the before mentioned manual valve 104 assumes. Turbine revolution speed sensor 305 detects revolution speed of the turbine shaft of fluid coupling 12. Change-over detection switch 298 is turned ON when rod 182 of shift operation mechanism 112 moves further beyond the maximum reduction ratio corresponding position (i.e., when rod 182 is disposed on the overstroke range). Engine coolant temperature sensor 306 generates an output signal when engine coolant temperature is lower than a predetermined value. Brake sensor 307 detects whether vehicle brake is used. Output signals from engine revolution speed sensor 301, vehicle speed sensor 302, and turbine revolution speed sensor 305 are supplied via associated wave shapers 308 and 309 to an input interface 311. Electric voltage signal from throttle opening sensor 303 is converted into a diginal signal at an AD converter 310 before supplied to input interface 311. Shift control unit 300 comprises input interface 311, a CPU (central processor unit) 313, a reference pulse generator 312, a ROM (random access memory) 315, and an output interface 316. These elements are interconnected by an address bus 319 and a data bus 320. Reference pulse generator 312 generates reference pulse on which CPU 313 operates. What are stored in ROM 314 include a program for control of stepper motor 110 and control of solenoid 224. RAM 317 temporarily stores information from various sensors and switch and parameters necessary for control. Output signals of shift control unit 300 is supplied via output interface 316 and an amplifier 317 to stepper motor 110 and via input interface 316 to solenoid 224.

Hereinafter, concrete explanation as to control of stepper motor 110 and solenoid 224 is made.

Figure 4:
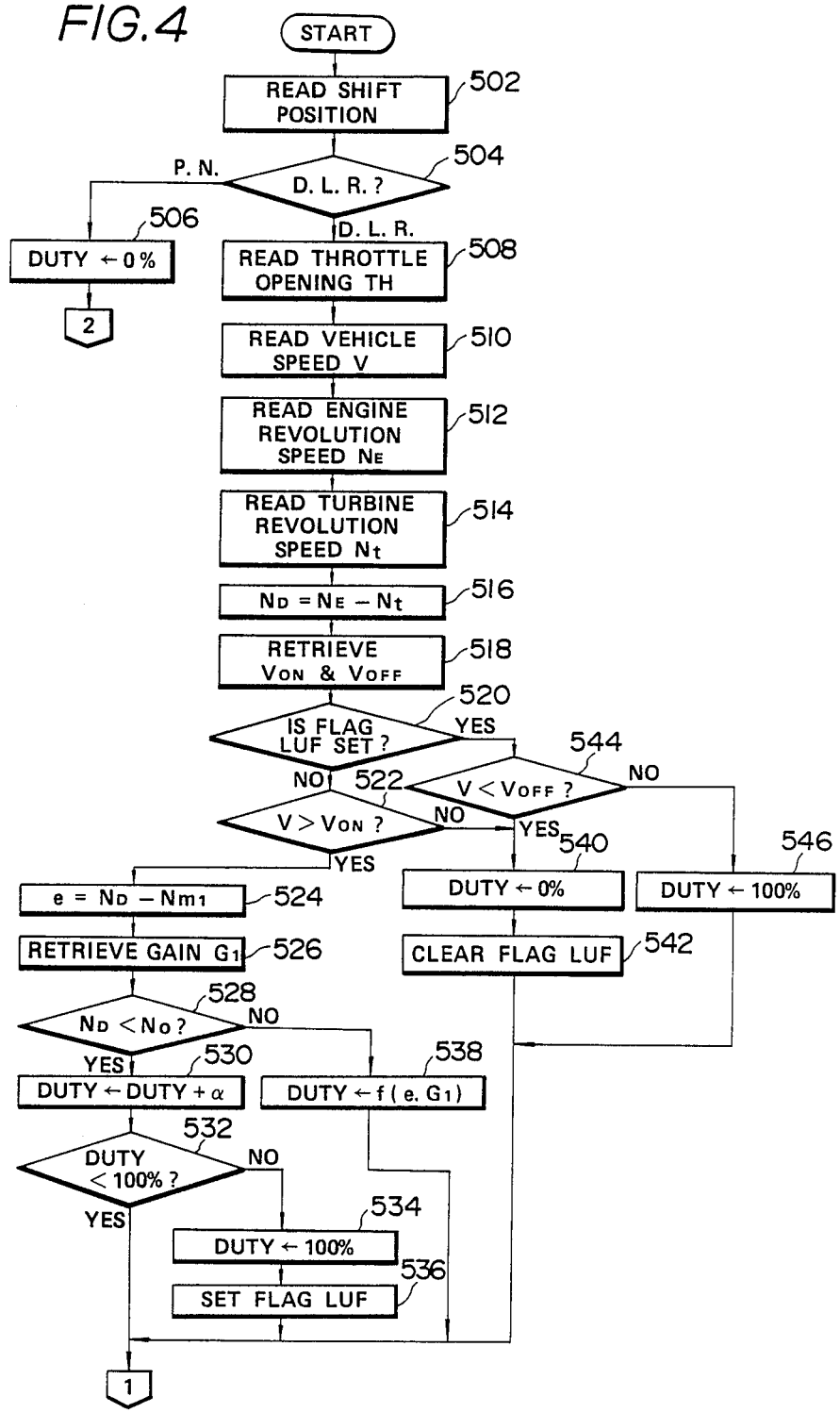
Figure 5:
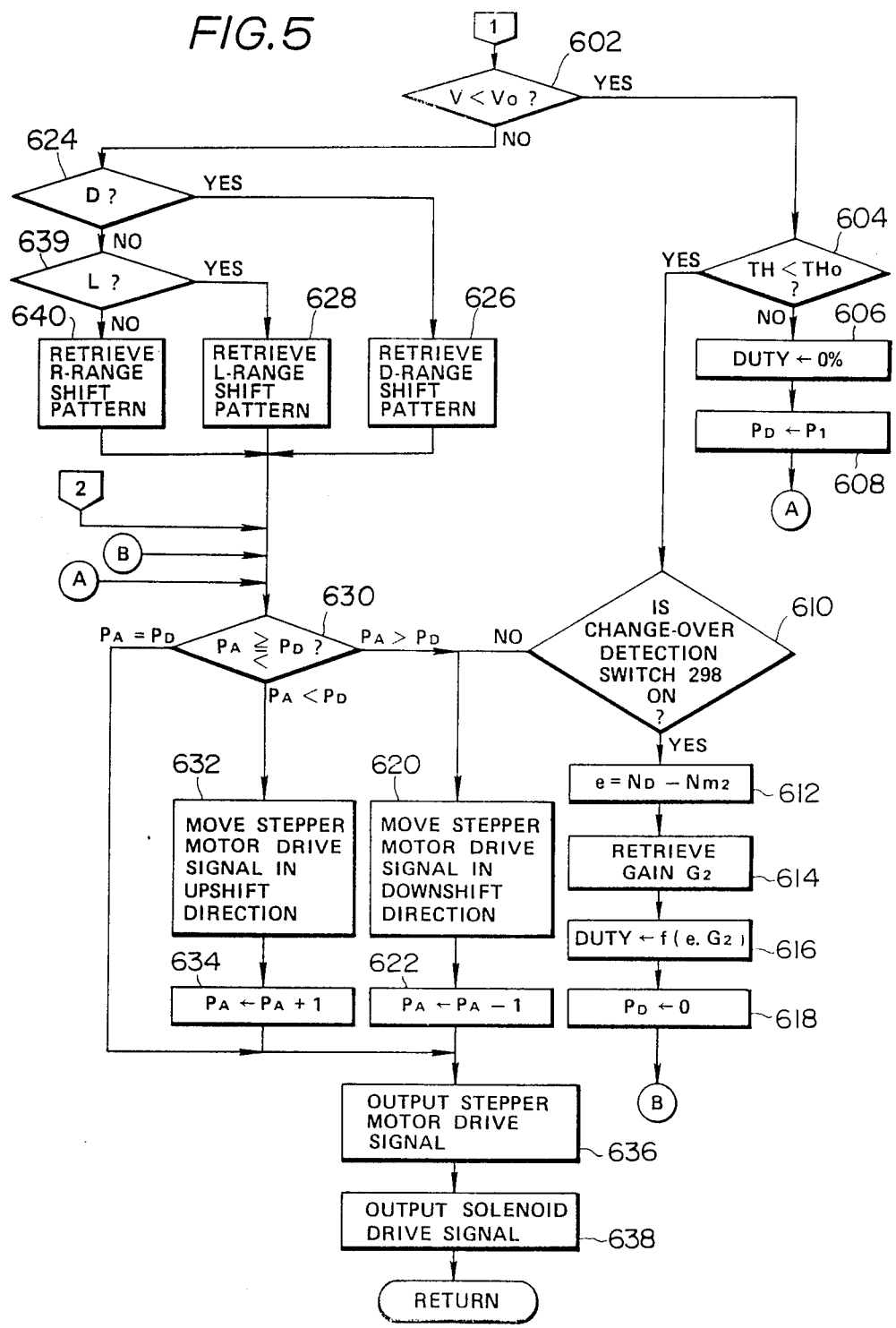
Figure 6:
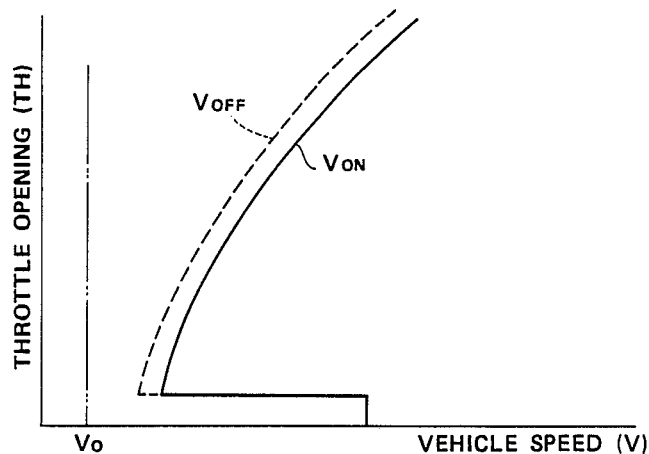
FIG. 6 is a graph showing variation in lock-up ON vehicle speed and lock-up OFF vehicle speed and FIG. 7 is a graph showing reduction ratio vs., stepper motor position.

FIGS. 4 and 5 show control routine for stepper motor 110 and solenoid 224. Shift position is read from shift position switch 304 (at step 502). Decision is made which one of drive or running positions (i.e., D, L or R range) is assumed (at step 504). When neither one of the drive positions is assumed, 0% is set as a duty ratio for solenoid 224 and placed at DUTY (at step 506). Then, step 630 is executed. When either one of drive positions is assumed, throttle opening TH is read from throttle opening sensor 303 (at step 508), vehicle speed V is read from vehicle speed sensor 302 (at step 510), engine revolution speed $N_E$ is read from engine revolution speed sensor 301 (at step 512), and turbine revolution speed $N_t$ is read from turbine revolution speed sensor 305 (at step 514). Then, a difference $N_D$ of engine revolution speed $N_E$ from turbine revolution speed $N_t$ is calculated (at step 516), and lock-up ON vehicle speed $V_{ON}$ and lock-up OFF vehicle speed $V_{OFF}$ are obtained by retrieval using vehicle speed V and throttle opening TH (at step 518). Data of lock-up ON vehicle speed $V_{ON}$ and lock-up OFF vehicle speed $V_{OFF}$ are stored versus vehicle speed V and throttle opening TH as shown in FIG. 6. Then, decision is made whether lock-up flag LUF is set (at step 520). When lock-up flag LUF is not set, decision is made whether actual vehicle speed V is larger than lock-up ON vehicle speed $V_{ON}$ (at step 522). In the case V is larger than $V_{ON}$, a deviation e of $N_{m1}$ from $N_D$ is calculated (at step 524), where $N_{m1}$ is a target value of deviation $N_D$ of turbine revolution speed $N_t$ from engine revolution speed $N_E$. Retrieval is executed based on e to provide a feedback control gain $G_1$ (at step 526). Then, decision is made whether $N_D$ is smaller than a predetermined small value $N_O$ (at step 528), where $N_O$ is such a value that if $N_D$ is not smaller than $N_O$, feedback control is executed, while if $N_D$ is smaller than $N_O$, feedforward control is executed. When $N_D$ is smaller than $N_O$, present duty ratio DUTY is increased by $\alpha$ (alpha) % and the result is placed as a new duty ratio at DUTY (at step 530). Then, decision is made whether duty ratio is lower than 100% (at step 532). When duty ratio DUTY is lower than 100%, step 602 is executed, while when duty ratio DUTY is not lower than 100%, duty ratio 100% is set and placed at DUTY (at step 534), and then lock-up flag LUF is set (at step 536) before executing the later mentioned step 602. (That is, feedforward control is executed.) In the case the difference $N_D$ is not smaller than $N_O$ at the before mentioned step 528, the duty ratio DUTY is determined based on the difference e and the feedback gain $G_1$ (at step 538), and then step 602 is executed. (That is, feedback control is executed.) In the case vehicle speed V is not higher than $V_{ON}$ at step 522, duty ratio 0% is set and placed at DUTY (at step 540), and then lock-up flag LUF is cleared (at step 542). In this process, the actuation of the lock-up mechanism is released. If, at step 520, lock-up flag LUF is set, decision is made whether vehicle speed V is lower than lock-up OFF vehicle speed $V_{OFF}$ (at step 544). When vehicle speed V is lower than $V_{OFF}$, step 540 and then step 542 are executed (lock-up release), whereas when vehicle speed V is not lower than $V_{OFF}$, duty ratio 100% is set and placed at DUTY (at step 546). (In this process, the lock-up state is maintained.)

Through the execution of the steps 502 to 546 explained above, the following control is brought about. That is, whenever shift position is P or N range position, i.e., not any of drive range positions, the lock-up state is always released (see step 506), whereas, under a condition when the shift position is one of the drive range positions, when vehicle speed V is higher than lock-up OFF vehicle speed $V_{OFF}$, the lock-up state is maintained (see step 546), and on the other hand, when vehicle speed V is lower than lock-up OFF vehicle speed $V_{OFF}$, the actuation of lock-up state is released (see step 540). Besides, upon shifting from non-lock-up state (release state) to lock-up state, the lock-up mechanism, i.e., friction clutch element 12d, is smoothly engaged owing to feedback control (see step 538) or feedforward control (see step 530) depending on the amount of slip within fluid coupling 12.

Figure 7:
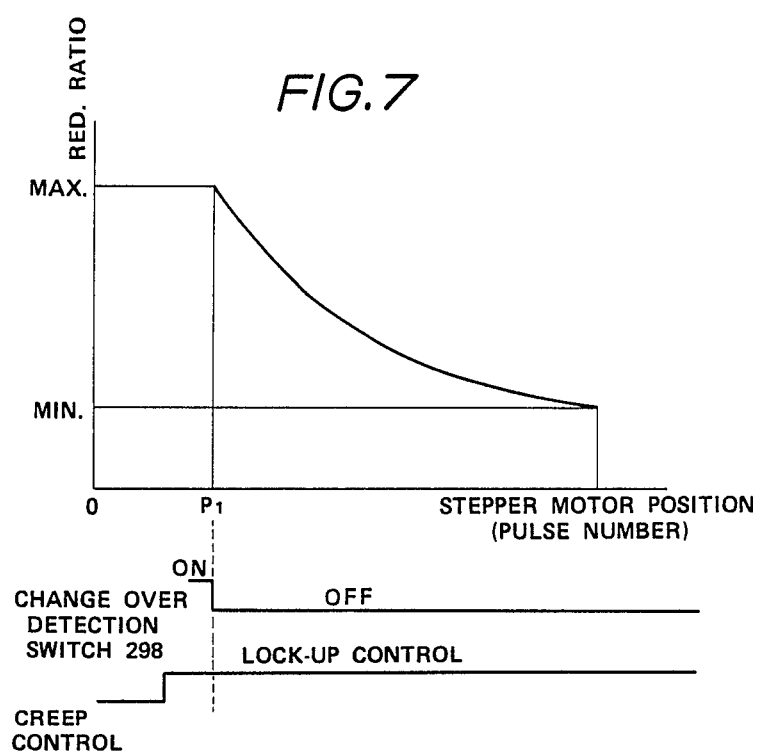

After executing step 532 or 536 or 538 or 542 or 546, step 602 is executed. At step 602, decision is made whether vehicle speed V is lower than a predetermined small value $V_0$ ($V_0$ is 2 to 3 Km/h, for example, that is lower than $V_{ON}$ and $V_{OFF}$ as shown in FIG. 6). If vehicle speed V is lower than $V_0$, the creep control is executed, whereas if vehicle speed V is not lower than $V_0$, the shift control is executed. In the case vehicle speed V is lower than $V_0$, decision is made whether throttle opening degree TH is less than a predetermined small value $TH_0$ (at step 604). When throttle opening degree TH is not less than $TH_0$, i.e., when the throttle is not at the idle position, duty ratio 0% is set and placed at DUTY (at step 606) (whereupon forward clutch 40 is completely engaged), and a pulse number $P_1$ is set as a target pulse number $P_D$ of stepper motor 110 (at step 608). As shown in FIG. 7, pulse number $P_1$ is indicative of the operation position of stepper motor 110 which corresponds to the maximum reduction ratio. (That is, the operating position of stepper motor 110 determined by this pulse number $P_1$ is a boundary between shift control range and overstroke range.) After step 608, the program proceeds to step 630, initiating such a control as to bring actual position of stepper motor 110 into agreement with the position designated by the pulse number $P_1$. When, at step 604, the throttle opening degree TH is less than $TH_0$, i.e., the throttle takes an idle position, decision is made whether change-over detection switch 298 is ON (at step 610). When, at step 610, change-over detection switch 298 is OFF, stepper motor drive signal is shifted in a downshift direction (at step 620), and pulse number $P_A$ is decreased by a value 1 (at step 622) before the output of stepper motor drive signal (at step 638) and the output of solenoid drive signal (at step 638). After the execution of step 620, stepper motor 110 is rotated by one step toward the overstroke range (i.e., in downshift direction). The execution of processing flow from step 610 to step 620 followed by the subsequent steps is repeated until rod 182 of stepper motor 110 moves into the overstroke range when change-over detection switch 298 is turned ON. After change-over detection switch 298 is turned ON, a difference between $N_D$ and $N_{m2}$ is set as e (at step 612), $N_D$ designating a difference between engine revolution speed NE and turbine revolution speed $N_t$, $N_{m2}$ designating a target deviation. Based on the value e, retrieval is made to give a feedback gain $G_2$ (at step 614). Then, a duty ratio is obtained as a function of the deviation e and feedback gain $G_2$ and placed at DUTY (at step 616), and 0 (zero) is placed as a target pulse number at $P_D$ (at step 618). Thereafter, the control proceeds to step 630.

When, at step 602 before mentioned, vehicle speed V is not lower than $V_0$, decision is made whether shift position is D range position (at step 624). When shift position is D range, D-range shift pattern is retrieved (at step 626). When shift position is not D range and it is decided that shift position is L range (at step 639), L-range shift pattern is retrieved (at step 628). When, at step 639, it is decided that shift position is not L range, R-range shift pattern is retrieved (at step 640). As a result of the process at each of the retrieval steps, a target pulse number $P_D$ is determined. Then, actual pulse number $P_A$ is compared with target pulse number $P_D$ obtained by retrieval (at step 630). When $P_D$ is equal to $P_A$, steps 636 and 638 are executed where stepper motor drive signal and solenoid drive signal are outputted without any alteration. When $P_A$ is smaller than $P_D$, stepper motor drive signal is shifted in an upshift direction (at step 632), and actual pulse number $P_A$ is increased by a value 1 (at step 634) before the output of stepper motor drive signal and solenoid drive signal at steps 636 and 638. When $P_A$ is larger that $P_D$, stepper motor drive signal is shifted in downshift direction (at step 620), and actual pulse number $P_A$ is decreased by a value 1 (at step 622) before the output of stepper motor drive signal at step 636 and the output of solenoid drive signal at step 638. For better understanding of stepper motor control using the actual pulse number and stepper motor drive signal, reference should be made to copending U.S. application Ser. No. 486,448, now U.S. Pat. No. 4,597,308, filed Apr. 19, 1983 (EP counterpart: EP publication N. 0092228, published on Oct. 26, 1983). This copending U.S. application also discloses a lock-up control using an electromagnetic valve employing a solenoid.

The process along the above mentioned steps 602 to 638 results in providing the following control. When vehicle speed is very low with throttle at idle state position and change-over switch 298 is ON, torque transfer capacity of forward clutch 40 is controlled by solenoid 224 such that slip of fluid coupling 12 is kept at a predetermined value (creep control, see steps 612 to 618). When throttle is not at idle state position although vehicle speed is very low, stepper motor 110 is urged to move to position indicated by pulse number $P_1$, so the execution of lock-up control is ready to start immediately. In the above mentioned manner, torque transfer capacity of forward clutch 40 is controlled at low vehicle speed idling by controlling throttle pressure, so that vehicle can creep to travel gradually. Under the other conditions, shifting in reduction ratio is made by stepper motor 110 in accordance with a predetermined shift pattern.

Hereinafter, explanation is made how the vehicle is controlled taking start-up as an example. When shift position is P range position or N range position and vehicle is at a standstill, process proceeds along steps 504, 506, 630, and the subsequent steps, and throttle pressure is kept at a high level and the maximum reduction ratio is maintained. When shift is made to D range position in this state, process proceeds along steps 504, 508, 510, 512, 514, 516, 518, 520, 522, 540, 542, 602, 604, 610, 612, and the subsequent steps, and creep control is executed. That is, stepper motor 110 causes rod 182 to move beyond the position at which change-over detection switch 298 is turned ON and further into overstroke range. This causes adjustment pressure change-over valve 108 to assume position indicated by lower half thereof as illustrated in FIG. 1 where throttle pressure is adjusted by adjustment pressure produced by solenoid 224. Under this condition, the solenoid 224 is feedback controlled so as to control torque transfer capacity of forward clutch 40 such that slip of fluid coupling 12 is kept at the predetermined value. As a result, forward clutch 40 is kept in slightly engaged state, thus allowing vehicle to shift into creep travelling state without any substantial shocks upon selecting from N range position to D range position. Increasing accelerator depression degree in this state causes process to proceeds from step 604 to step 606 followed by the subsequent steps. This causes throttle pressure to increase until forward clutch 40 is fully engaged, and stepper motor 110 to assume position indicated by pulse number $P_1$ in FIG. 7. As a result, adjustment pressure change-over valve 108 is shifted to position where adjustment pressure produced by solenoid 224 is applied to lock-up control valve 122. Since adjustment pressure is kept at the highest value at this instant, lock-up control valve 122 assumes position indicated by lower half thereof shown in FIG. 1, causing the lock-up mechanism to be released. After vehicle starts moving in this manner and increases its speed beyond vehicle speed $V_0$, process proceeds from step 602 to step 624 followed by the subsequent steps, and rotary position of stepper motor 110 is controlled in accordance with predetermined shift pattern. Until vehicle speed reaches lock-up ON vehicle speed $V_{ON}$, lock-up mechanism remains released. When vehicle speed reaches lock-up ON vehicle speed $V_{ON}$, process proceeds along step 520, 522, 524, and the subsequent steps where the solenoid 224 is subject to pulse duty factor ontrol, causing the lock-up control valve 122 to gradually shift from release position indicated by lower half thereof as illustrated in FIG. 1 to lock-up position indicated by upper half thereof as illustrated, thus gradually decreasing rotational speed difference between pump impeller 12b and turbine runner 12c until fluid coupling 12 is completely engaged. This lock-up state is maintained unless vehicle speed falls below lock-up OFF vehicle speed $V_{OFF}$, whereas reduction ratio is controlled by stepper motor 110 in accordance with predetermined shift pattern.

Hereinafter, adjustment pressure change-over valve 108, electromagnetically operated valve 118, throttle valve 114 (clutch pressure regulator valve), and lock-up control valve 112 are described altogether for ease of understanding of how the control device operates. First of all, when vehicle speed is low and throttle opening is small (i.e., when vehicle is almost at a standstill and engine is idling), stepper motor 110 is rotated into the overstroke range beyond the maximum reduction ratio corresponding position, allowing port 186b of adjustment pressure change-over valve 108 to communicate with port 186c thereof as indicated by lower half thereof as illustrated in FIG. 1. In this position, hydraulic fluid line 190 is allowed to communicate with hydraulic fluid line 189, and thus hydraulic pressure within hydraulic fluid line 189 that communicates via choke type flow restrictor 252 with hydraulic fluid line 209 supplied with constant fluid pressure by constant fluid pressure regulator valve 116, is adjusted by solenoid valve 118. That is, electromagnetic valve 18 regulates amount of drainage of hydraulic fluid via port 222 in accordance with electric signal supplied thereto by control unit 300, thereby to vary hydraulic pressure within hydraulic fluid lines 190 and 189 in a desired manner. Hydraulic pressure in hydraulic fluid lines 190 and 189 obtained by such regulation is controlled in inverse proportion to the amount of electric current supplied to solenoid 224. Throttle pressure rises as adjustment pressure rises because the adjustment pressure in hydraulic fluid line 189 is applied to port 192g of throttle valve 114. That is, throttle pressure (clutch supply hydraulic pressure) rises upto the maximum when the amount of electric current supplied to solenoid 224 is 0 (zero), and throttle pressure decreases as the amount of electric current supplied to solenoid 224 increases. An appropriate amount of electric current is supplied to solenoid 224 when vehicle speed is low and throttle opening degree is small in such a manner as to adjust throttle pressure in hydraulic fluid line 140 to a relatively low appropriate value. With this relatively low throttle pressure, forward clutch 40 or reverse brake 50 is urged to assume such slightly engaged state that a predetermined amount of creep torque is transferred. As a result, when vehicle is almost at a standstill and engine is idling, forward clutch 40 or reverse brake 50 is slightly engaged so as to establish a predetermined creep state. Because, as described above, the throttle pressure set relatively low acts on forward clutch 40 or reverse brake 50, there occurs very low shocks upon selecting D range from N range.

In this position, when stepper motor 110 is rotated in such a direction as to establish a reduction ratio on small reduction ratio side, adjustment pressure change-over valve 108 assumes a position where port 186b is allowed to communicate with port 186a. This causes hydraulic fluid line 190 to communicate with hydraulic fluid line 188. Thus, hydraulic fluid pressure in hydraulic fluid line 188 that communicates via choke type flow restrictor 250 with hydraulic fluid line 209 supplied with constant fluid pressure by constant fluid pressure regulator valve 116, is adjusted by solenoid valve 118. When vehicle speed is low, solenoid 224 is turned OFF. Thus, adjustment pressure in hydraulic fluid lines 190 and 188 is adjusted to its highest or maximum value. Because hydraulic fluid pressure in hydraulic fluid line 188 is applied to port 240h of lock-up control valve 122, spool 242 of lock-up control valve 122 assumes position indicated by lower half thereof as illustrated in FIG. 1. When spool 242 assumes position indicated by lower half thereof as illustrated in FIG. 1, coupling pressure produced by coupling pressure regulator valve 120 is supplied to lock-up fluid chamber 12a, rendering lock-up mechanism released. When, in this state, vehicle speed increases upto satisfy a predetermined condition, the maximum amount of electric current is supplied to solenoid 224, rendering hydraulic pressure in hydraulic fluid lines 190 and 188 to take minimal value. This causes spool 242 of lock-up control valve 122 that is subject to constant pressure applied to port 240b to shift from position indicated by lower half thereof to position indicated by upper half thereof. When spool 242 assumes position indicated by upper half thereof, hydraulic fluid is discharged from lock-up chamber 12a, thus rendering lock-up mechanism fully engaged. From the above description, it will now be understood that, owing to solenoid valve 118, two different controls can be carried out, one for adjustment of throttle pressure before start-up of vehicle, the other for lock-up control valve 122. In order to effect change-over between the creep torque control and the lock-up control, hydraulic fluid line path is switched by adjustment pressure change-over valve 108 in hydraulic fluid pressure circuit, but electric change-over is carried out by change-over detection switch 298 that change its ON/OFF state when rod 182 plunges into overstroke range.

What is claimed is:

1. A control device for an automatic transmission for a motor vehicle having an engine, the automatic transmission including a hydrokinetic torque transmitting unit having an input element coupled with the engine and an output element, the hydrokinetic torque transmitting unit having a lock-up mechanism that is hydraulically operated and having a lock-up state where the input element is mechanically connected with the output element and a release state where the input element is fluidly connected with the output element, the automatic transmission also including a drive mechanism drivingly connected to the output element of the hydrokinetic torque transmitting unit, the drive mechanism including a hydraulically operated friction device that is engageable to establish a torque delivery path through the drive mechanism, said control device comprising:

means for generating a servo actuating hydraulic fluid pressure for actuating the hydraulically operated friction device, said servo actuating hydraulic fluid pressure being supplied to the hydraulically operated friction device;

means, including a lock-up control valve having a valve member movable between a lock-up position and a release position, for rendering the lock-up mechanism operable in the lock-up state when said valve member assumes said lock-up position, and rendering the lock-up mechanism operable in the release state when said valve member assumes said release position;

an electromagnetic means for effecting a pressure regulation and generating an adjustment fluid pressure;

means for connecting said electromagnetic means selectively to said servo actuating fluid pressure generating means or to said lock-up control valve, said connecting means being operative to connect said electromagnetic means to said servo actuating hydraulic fluid pressure generating means to supply said adjustment fluid pressure to said servo actuating fluid pressure generating means to allow said servo actuating fluid pressure to be modified by said adjustment fluid pressure when a predetermined condition of the motor vehicle is satisfied, said connecting means being operative to connect said electromagnetic means to said lock-up control valve to supply said adjustment fluid pressure to said lock-up control valve to allow said valve member of said lock-up control valve to be urged by said adjustment fluid pressure when said predetermined condition fails to be satisfied; and means for controlling said electromagnetic means such that said adjustment fluid pressure is variable in a first pattern when said predetermined condition is satisfied and said adjustment fluid pressure is variable in a second pattern when said predetermined condition fails to be satisfied.

2. A control device as claimed in claim 1, wherein said electromagnetic means includes a plunger for closing said drain line, a spring biasing said plunger toward a position where said plunger closes said drain line, and a solenoid around said plunger which electromagnetically urges said plunger against said spring when supplied with electric current.

3. A control device as claimed in claim 1, wherein said connecting means includes an adjustment pressure change-over valve having a rod with lands thereon, said rod being operatively connected with the drive mechanism of the automatic transmission, said rod having a first position where said electromagnetic means is connected to said servo actuating hydraulic fluid pressure generating means, but it is disconnected from said lock-up control valve, and a second position where said electromagnetic means is disconnected from said servo actuating hydraulic fluid pressure generated means, but it is connected to said lock-up control valve.

4. A control device for an automatic transmission for a motor vehicle having an engine with a throttle, the automatic transmission including a hydrokinetic torque transmitting unit having an input element coupled with the engine and an output element, the hydrokinetic torque transmitting unit having a lock-up mechanism that is hydraulically operated and having a lock-up state where the input element is mechanically connected with the output element and a release state where the input element is fluidly connected with the output element, the automatic transmission also including a drive mechanism drivingly connected to the output element of the hydrokinetic torque transmitting unit, the drive mechanism including a hydraulically operated friction device that is engageable to establish a torque delivery path through the drive mechanism, said control device comprising:

means for generating a servo actuating hydraulic fluid pressure for actuating the hydraulically operated friction device, said servo actuating hydraulic fluid pressure being supplied to the hydraulically operated friction device;

means, including a lock-up control valve having a valve member movable between a lock-up position and a release position, for rendering the lock-up mechanism operable in the lock-up state when said valve member assumes said lock-up position, and rendering the lock-up mechanism operable in the release state when said valve member assumes said released position;

means for generating a constant hydraulic fluid pressure;

means for defining a first fluid line connecting said constant hydraulic fluid pressure generating means to said servo actuating fluid pressure generating means;

means for defining a second fluid line connecting said constant hydraulic fluid pressure generating means to said lock-up control valve;

means, including a drain line, for connecting said drain line selectively to said first fluid line or said second fluid line, said connecting means being operative to connect said drain line to said first fluid line when a predetermined condition of the motor vehicle is satisfied, said connecting means being operative to connect said drain line to said second fluid line when said predetermined condition fails to be satisfied;

means for regulating the discharge of hydraulic fluid from said drain line; and means for controlling said regulating means so that an adjustment hydraulic fluid pressure variable in a first pattern builds up in said first fluid line when said predetermined condition of the motor vehicle is satisfied and an adjustment hydraulic fluid pressure variable in a second pattern builds up in said second fluid line when said predetermined condition of the motor vehicle fails to be satisfied, said adjustment hydraulic fluid pressure variable in said first pattern being supplied to said servo actuating hydraulic fluid pressure generating means to modify said servo actuating hydraulic fluid pressure, said adjustment hydraulic fluid pressure variable in said second pattern being supplied to said lock-up control valve to bias said valve member.

5. A control device as claimed in claim 4, wherein said regulating means is in the form of an electromagnetic valve that includes a plunger for closing said drain line, a spring biasing said plunger toward a position where said plunger closes said drain line, and a solenoid around said plunger which electromagnetically urges said plunger against said spring when supplied with electric current.

6. A control device as claimed in claim 4, wherein said constant hydraulic fluid pressure generating means is in the form of a constant pressure regulator valve.

7. A control device as claimed in claim 4, wherein said servo actuating hydraulic fluid pressure generating means is a throttle valve that effects pressure regulation in response to load which the engine is subject to.

8. A control device as claimed in claim 4, wherein said rendering means includes a coupling pressure regulator valve for generating a coupling fluid pressure supplied to said lock-up control valve.

* * * * *